United States Patent [19]
Yamamura et al.

[11] Patent Number: 5,958,212
[45] Date of Patent: Sep. 28, 1999

[54] STORAGE APPARATUS AND SHOCKPROOF CASE

[75] Inventors: Toshiki Yamamura, Suita; Toshiyuki Wada, Toyonaka; Makoto Kuwamoto, Hirakata, all of Japan

[73] Assignee: Matsushita Electric Industrial, Osaka-Fu, Japan

[21] Appl. No.: 09/017,781

[22] Filed: Feb. 3, 1998

[30] Foreign Application Priority Data

Feb. 5, 1997 [JP] Japan .................................. 9-022706

[51] Int. Cl.⁶ .................................................. B65D 85/30
[52] U.S. Cl. .......................... 205/723; 206/592; 206/594
[58] Field of Search .................................. 206/576, 722, 206/723, 724, 521, 591, 592, 594, 523

[56] References Cited

U.S. PATENT DOCUMENTS

| | | |
|---|---|---|
| 4,812,932 | 3/1989 | Hishinuma et al. . |
| 4,937,806 | 6/1990 | Babson et al. . |
| 5,041,924 | 8/1991 | Blackborow et al. . |
| 5,079,655 | 1/1992 | Yagi . |
| 5,253,129 | 10/1993 | Blackborow et al. . |
| 5,349,486 | 9/1994 | Sugimoto et al. . |
| 5,395,007 | 3/1995 | Housholder et al. ............... 206/594 X |
| 5,398,808 | 3/1995 | Chen et al. ........................ 206/591 X |
| 5,491,608 | 2/1996 | Koyanagi et al. . |

FOREIGN PATENT DOCUMENTS

| | | |
|---|---|---|
| 1-243287 | 9/1989 | Japan . |
| 5-314745 | 11/1993 | Japan . |

*Primary Examiner*—Jacob K. Ackun
*Attorney, Agent, or Firm*—Panitch Schwarze Jacobs & Nadel, P.C.

[57] ABSTRACT

A storage apparatus of the present invention has an HDA of a storage portion, a box frame for containing the HDA and fixed to the HDA by bolts, and a protection box for incorporating at least the HDA and the box frame. A plurality of supporting members are arranged between the box frame and an inner surface of the protection box, so that the supporting members elastically support the HDA and the box frame in the protection box.

15 Claims, 9 Drawing Sheets

STORAGE APPARATUS AND SHOCKPROOF CASE

BACKGROUND OF THE INVENTION

The present invention relates to a storage apparatus for storing digital signals such as a digital video signal and a digital audio signal, and a shockproof case for the storage apparatus.

In recent years, an apparatus for recording and playback a digital video signal and a digital audio signal has been used in many ways. Particularly, in an audiovisual field for a professional service, for example, a portable type audiovisual apparatus equipped with a computer has been used for news coverage generally. In addition, data (digital signals) of the news coverage have been often processed and edited with the computer of the portable type audiovisual apparatus. This is because such digital signals do not degrade by duplication, and are easily processed on the computer.

Meanwhile, a storage apparatus for storing the above-mentioned video and audio signals, for example, a fixed magnetic disk apparatus (hereinafter, referred to as an "HDD") has an increasingly larger storage capacity and an increasingly faster speed for recording and playback data. More specifically, in the case of a 3.5 inch HDD, for example, the 3.5 inch HDD having the storage capacity of $10 \times 10^9$ bytes is being made practical. It is expected that the storage capacity of this 3.5 inch HDD will be larger 1.6 time every one year.

As the storage capacity of the HDD increases, the HDD is used as the recording and playback apparatus for the above-mentioned video and audio signals in more various audiovisual apparatuses. Furthermore, in the case that the HDD is used as a detachable recording and playback apparatus from the portable type audiovisual apparatus, it is expected to realize functions which were impossible to availe with a conventional tape-type storage apparatus, through utilization of a high speed and random accessibility of the HDD. Concretely, in such audiovisual apparatus, it is expected to realize a realtime non-linear field editing function and a pre-recording function which allows to record a few seconds ahead of pressing of a record button.

However, it is known that the HDD has the following characteristics (1) through (3):

(1) A magnetic head floats up an extremely short distance of few hundreds angstroms from a surface of a recording medium during an operating state.

(2) The magnetic head moves relative to the recording medium, following information tracks each having a width of few microns, thereby recording or playback the signal.

(3) The magnetic head is in a direct contact with the recording medium at a non-operating state.

Hence, if the HDD receives an impact force applied directly to the audiovisual apparatus or an external shock as the HDD is accidentally dropped during being transported, attached or detached from an assembled set, there is a possibility that the signal is not recorded or reproduced exactly. Further, the magnetic head damages the recording medium, so that there is a problem that data (information) are lost in the damaged portion of the recording medium. Still further, the magnetic head itself may be destroyed.

Accordingly, in the audiovisual apparatus equipped with the HDD, it is important to ensure the reliability of the HDD. In particular, in the case that the HDD is used as the recording and playback apparatus of the portable type audiovisual apparatus, it is strongly required to guarantee the shockproofness of the HDD.

With regard to the aforementioned problems, U.S. Pat. No. 5,253,129 discloses a conventional shockproof supporting apparatus for a detachable HDD.

The conventional shockproof supporting apparatus will be explained with reference to FIGS. 8 and 9 concretely.

FIG. 8 is an exploded perspective view showing a conventional shockproof supporting apparatus for an HDD, and FIG. 9 is a cross sectional view showing an internal structure of the conventional shockproof supporting apparatus shown in FIG. 8.

As shown in FIGS. 8 and 9, a conventional HDD pack 30 comprises a head disk assembly (hereinafter, referred to as an "HDA") 31 formed into a box shape, and a protection box 32 for containing the HDA 31. The HDD pack 30 is detachable from an apparatus to which the HDD pack 30 is attached. As shown in FIG. 9, the HDA 31 comprises a plurality of disks 35 which are magnetic recording mediums, a spindle motor 36 for rotating while supporting the disks 35, and a plurality of magnetic heads 37 for recording and playback data. Furthermore, the HDA 31 has arms 38 for supporting the respective magnetic heads 37, an actuator 39 for positioning the magnetic heads 37, and a box frame 40 shaped as a rectangular parallelopiped for containing the above-mentioned elements. A supply of an electric power to the HDA 31 and a signal transfer between the HDA 31 and the apparatus attaching to the HDD pack 30 are realized through a connector (not shown) fixed to the box frame 40.

The protection box 32 is configured with a top plate 32a, a frame member 32b and a bottom plate 32c, and thereby is formed into a rectangular parallelopiped shape. A plurality of supporting members 33 and a plurality of pad members 34 for the respective supporting members 33 are disposed between HDA 31 and the protection box 32. Each of the pad members 34 is fixed at a predetermined position in an outer surface of the box frame 40, and the supporting members 33 are fixed to the pad members 34, respectively. When the HDA 31 is contained in the protection box 32, each of the supporting members 33 comes in contact with an inner surface of the protection box 32, and thereby to support the HDA 31 shockproof.

As has been explained in the above, in the conventional HDD pack 30, a plurality of the supporting members 33 are disposed between the HDA 31 and the protection box 32, so as to realize the shockproofness and a buffering effect in the support members 33.

However, in the conventional shockproof supporting apparatus, it was assumed that the HDD pack 30 was integrated with the computer principally. Therefore, in the case that the HDD is used as a detachable storage apparatus for the portable type audiovisual apparatus, the HDD is required to be resistant to a large impact force applied when the portable type audiovisual apparatus is hit against an obstacle and the like, or an external shock applied while the HDD is carried around.

In general, the HDD can bear an impact acceleration of about 300 G at the non-operating state. However, for instance, if the HDD is dropped onto a tile floor from the height of 76 cm, the impact force upon the HDD is 1,500 G or larger. Further, when the portable type audiovisual apparatus records or reproduces while moving, the impact force upon the portable type audiovisual apparatus may reach as much as maximum 10 G in some cases. Even when in such a condition, the HDD integrated in the portable type audiovisual apparatus must be able to perform reliable recording and reproduction without having data lost or damaged.

Accordingly, in the case that the HDD is used as the detachable storage apparatus for the portable type audiovisual apparatus, it is required that the HDD pack must have a structure which makes it unlikely that the HDD is dropped. Further, even if the detachable storage apparatus (the HDD) is dropped by mistake while transported or replaced, the HDD pack must have the shockproofness so that data will not be lost or damaged in the HDD. In addition, the HDD pack needs be as small as possible to an extent that the portability is not sacrificed.

BRIEF SUMMARY OF THE INVENTION

The object of the present invention is to provide a storage apparatus and a shockproof case for the storage apparatus that can solve the aforementioned problems in the conventional apparatus and can be structured with less cost and has a long life.

In order to achieve the aforementioned object, a storage apparatus and a shockproof case for the storage apparatus comprises:

storage means, holding means disposed around the storage means and for holding the storage means, a protection box for containing the storage means and the holding means, and a supporting member disposed between the holding means and the protection box, and the supporting member for supporting the holding means to the protection box elastically.

According to the above-mentioned structure, it is possible to prevent a force including an impact force applied to the protection box from outside from directly acting upon the storage means, and the supporting member can buffer the force from outside.

In the storage apparatus of another aspect of the present invention, the holding means includes a box frame for containing the storage means, fixing means for fixing the storage means and the box frame, and an intermediate member disposed between the storage means and the box frame, and the supporting member is disposed between the box frame and the protection box, the supporting member is fixed to one of the box frame and the protection box, and supporting member elastically supporting the box frame in the protection box.

According to the above-mentioned structure, it is possible to prevent the force including the impact force applied to the protection box from outside from directly acting upon the storage means, and the supporting member can mitigate force from outside. Further, even when the box frame is largely deformed, because of a buffering effect of the intermediate member, it is possible to prevent the force such as the impact from acting upon the storage means.

In the storage apparatus of another aspect of the present invention, the intermediate member is formed by a resin sheet.

According to the above-mentioned structure, it is possible to prevent the force including the impact force applied to the protection box from outside from directly acting upon the storage means, and the supporting member can buffer the force from outside.

In the storage apparatus of another aspect of the present invention, the holding means includes a box frame for containing the storage means, fixing means for fixing the storage means and the box frame, and a resin spacer disposed between the fixing means and the box frame, and the supporting member is disposed between the box frame and the protection box, the supporting member is fixed to one of the box frame and the protection box, the supporting member elastically supporting the box frame in said protection box.

According to the above-mentioned structure, it is possible to prevent the force including the impact force applied to the protection box from outside from directly acting upon the storage means, and the supporting member can buffer the force from outside.

In the storage apparatus of another aspect of the present invention, the fixing means fixes the storage means and the box frame to each other through fastening force maintaining means disposed outside the box frame.

According to the above-mentioned structure, a fixed state of the storage means and the box frame is maintained with the fastening force maintaining means.

In the storage apparatus of another aspect of the present invention, irregularities are formed in an outer surface of the protection box.

According to the above-mentioned structure, it is possible to prevent a user from dropping the storage apparatus by mistake.

In the storage apparatus of another aspect of the present invention, a slip-proof plate having irregularities is disposed on an outer surface of the protection box.

According to the above-mentioned structure, it is possible to prevent the user from dropping the storage apparatus by mistake.

In the storage apparatus of another aspect of the present invention, the supporting member and the protection box are structured so as to satisfy the following relationship:

$$2\times(F/xs) \leq F/xh$$

wherein xs is a maximum displacement of the supporting member in a direction in which force F acts when the force F acts upon the supporting member from the protection box, and xh is a maximum displacement of the protection box in the direction in which the force F acts when the force F acts upon the protection box from the supporting member.

According to the above-mentioned structure, it is possible to prevent creation of the impact force upon the storage means due to deformation of the protection box.

In the storage apparatus of another aspect of the present invention, the protection box is formed by a material which is divided into two portions of an upper portion and a lower portion at the center of the protection box in the direction of the thickness of the protection box.

According to the above-mentioned structure, it is possible to improve the strength of the protection box.

In the storage apparatus of another aspect of the present invention, the supporting member is disposed in the protection box in such a condition that the supporting member has an initial displacement of 5 to 15% of a free length of the supporting member.

According to the above-mentioned structure, it is possible to keep the supporting member and the protection box in a stable contact with each other.

In the storage apparatus of another aspect of the present invention, as means for applying the initial displacement to the supporting member disposed in the protection box, a resin member is disposed on a surface of the supporting member on the side of the protection box.

According to the above-mentioned structure, it is possible to keep the supporting member and the protection box in a stable contact with each other.

In the storage apparatus of another aspect of the present invention, an air damper is disposed between an inner surface of the protection box and the box frame, and an air vent hole for exhausting air from the air damper is formed in the protection box.

According to the above-mentioned structure, it is possible to enhance a buffering effect against the impact force and it is easy to realize the storage apparatus in a small size.

In the storage apparatus of another aspect of the present invention, the air damper includes approximately cylindrical air chambers stacked into a stack of at least two portions of an upper portion and a lower portion in such a manner that side surfaces of the air chambers are shaped as an accordion fold, and an orifice is formed in a surface of one of the air chamber disposed at one end in such a manner that the orifice is directed toward the air vent hole.

According to the above-mentioned structure, it is possible to enhance a buffering effect against the impact force and it is easy to realize the storage apparatus in a small size.

In the storage apparatus of another aspect of the present invention, the air damper is formed by a resin.

According to the above-mentioned structure, it is possible to reduce the impact force having a high frequency.

In a shockproof case for a storage apparatus which comprises:

holding means disposed around storage means to be held, the holding means fixed to the storage means, a protection box for containing the storage means and the holding means, and a supporting member disposed between the holding means and the protection box, and the supporting member elastically supporting the holding means to the protection box.

According to the above-mentioned structure, it is possible to prevent the force including the impact force applied to the protection box from outside from directly acting upon the storage means, and the supporting member can buffer the force from outside.

DETAILED DESCRIPTION OF THE INVENTION

The preferred embodiments of a storage apparatus and a shockproof case for the storage apparatus of the present invention will be described with reference to the accompanying drawings.

First Embodiment

Figure 1:
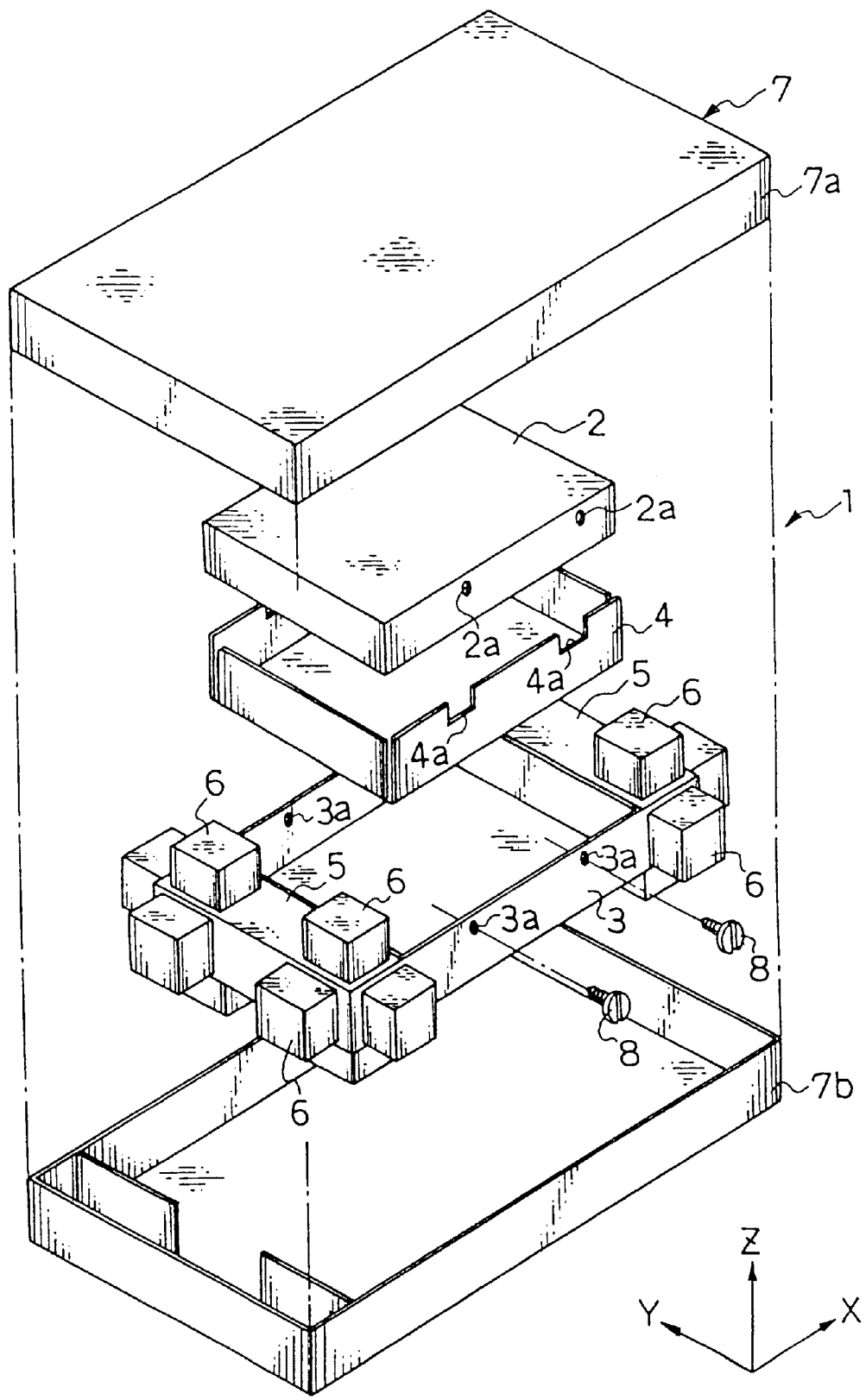
FIG. 1 is an exploded perspective view showing an internal structure of a storage apparatus in a first embodiment of the present invention.

FIG. 1 is an exploded perspective view showing an internal structure of a storage apparatus in a first embodiment of the present invention.

In FIG. 1, a storage apparatus 1 comprises a head disk assembly (hereinafter, referred to as an "HDA") 2 for storing digital signals such as a digital video signal and a digital audio signal, a box frame 3 formed into a box shape with an open top surface and for containing the HDA 2, and an intermediate member 4 disposed between the HDA 2 and the box frame 3. Further, the storage apparatus 1 includes two prismatic support carrier members 5 fixed to the respective outer surfaces of the box frame 3 on the both sides in a direction (in a direction "Y" of FIG. 1) of the shorter sides of the box frame 3, and a plurality of supporting members 6 fixed to the box frame 3 through the support carrier members 5 and for supporting the box frame 3 elastically. Further, the storage apparatus 1 has a protection box 7, which forms an outer case of the storage apparatus 1, configured with two members 7a, 7b defined by dividing the protection box 7 into two at the center in a direction (in a direction "Z" of FIG. 1) of the thickness of the protection box 7. The storage apparatus 1 is structured to be detachable from an apparatus to which the storage apparatus 1 is attached, such as a portable type audiovisual apparatus. The storage apparatus 1 is configured by assembling the HDA 2, the box frame 3, the intermediate member 4, the support carrier members 5 and the supporting members 6 integrally with each other, and thereafter containing the integrally assembled object in the protection box 7. In the storage apparatus 1 of the first embodiment, the box frame 3, the intermediate member 4, the support carrier members 5, the supporting members 6, the protection box 7, and bolts 8 described later for fixing the HDA 2 and the box frame 3 to each other form a shockproof case for the HDA 2 which serves as a storage portion.

Figure 9:
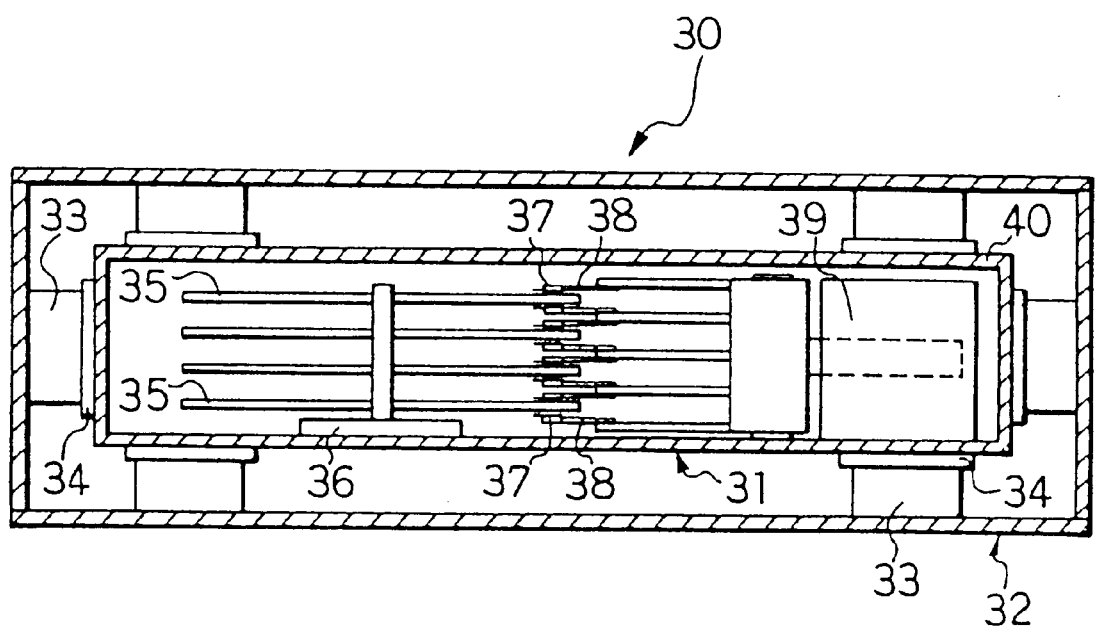
FIG. 9 is a cross sectional view showing an internal structure of the conventional shockproof supporting apparatus shown in FIG. 8.

The HDA 2 is similar to that described in the description of "BACKGROUND OF THE INVENTION" with reference to FIG. 9, and incorporates a plurality of magnetic recording mediums, a plurality of magnetic heads, etc (not shown). An outer size of the HDA 2 is depth×width×height= 100×70×19 mm, for instance. A supply of an electric power to the HDA 2 and a signal transfer between the HDA 2 and the apparatus to which the storage apparatus 1 is attached are realized through a connector (not shown) fixed to the protection box 7. Further, the connector fixed to the protection box 7 and the HDA 2 are connected with each other by a cable which is not shown. The cable is formed by a flexible conductive wire so that the cable is not severed or does not restrain a movement of the HDA 2 even if the HDA 2 is largely moved in the protection box 7 by an impact force.

A plurality of, for example, two fixing holes 2a are formed in each one of the both side surfaces of the HDA 2 in a longitudinal direction (in a direction "X" of FIG. 1) of the HDA 2. The bolts 8 which serve as fixing members are inserted into and fixed at the holes 2a through holes 3a formed in the box frame 3 and recess portions 4a formed in the intermediate member 4. Thereby, the HDA 2 is fixed to the box frame 3 with the intermediate member 4 placed between the HDA 2 and the box frame 3. The box frame 3 is formed into a rectangle box shape by bending a plate of metal such as stainless steel, which has a thickness of 0.5 mm, for instance, at the four sides in one direction.

The intermediate member 4 is formed by an elastic resin sheet including a vinyl chloride or similar resin, which has a thickness of 0.5 mm, for instance. Therefore, even when the box frame 3 or the support carrier members 5 is deformed by the impact force created as the storage apparatus 1 is dropped, the intermediate member 4 prevents the box frame 3 and the support carrier members 5 from directly contacting the HDA 2. Further, it is possible to prevent a local damage to the HDA 2 by a buffering effect of the intermediate member 4. In addition, when the HDA 2 is fixed to the box frame 3, the intermediate member 4 serves as a positioning member to fix the HDA 2 to the box frame 3 while preventing the HDA 2 from hitting and accordingly applying an impact upon the box frame 3.

Each of the support carrier members 5 is formed by a resin including an ABS (Acrytonitrile Butadiene Styrene) or similar resin. Further, the support carrier members 5 are fixed to side surfaces of the box frame 3 by fixing means such as bolts, respectively.

Each of the supporting members 6 is configured by a material which mitigates and absorbs a force including the impact force and the like, and more specifically, by a rubber material such as urethane or silicon in a gel state, and butyl rubber. Further, each of the supporting members 6 is fixed to a surface of the respective support carrier members 5 at a predetermined position by monolithic molding. When the supporting members 6 are contained in the protection box 7, the supporting members 6 are disposed between an inner surface of the protection box 7, the box frame 3 and the support carrier members 5 so as to contact with the inner surface of the protection box 7. Thereby, the supporting members 6 elastically support the HDA 2 shockproof within the protection box 7 through the box frame 3. In each the supporting members 6, material (hardness), thickness of the supporting members 6 and the area size of a surface to be contact with the inner surface of the protection box 7 are selected optimum such that the HDA 2 is not damaged permanently and the supporting members 6 are deformed minimum quantities even when the storage apparatus 1 is dropped from a limit height to be guaranteed. A specific total weight of the HDA 2, the box frame 3 and the support carrier members 5 which are supported by each supporting members 6 is 300 g, for instance.

Apart from the aforementioned explanation, wherein each of the supporting members 6 is fixed to the box frame 3 through the respective support carrier members 5 and comes in a contact with the inner surface of the protection box 7, an alternative construction may be such that each of the supporting members 6 is fixed to the inner surface of the protection box 7 and comes in a contact with the surfaces of the support carrier members 5. That is, each of the supporting members 6 may be disposed in the protection box 7 in such a manner that each of the supporting members 6 is fixed to one of the box frame 3 through the respective support carrier members 5 and the inner surface of the protection box 7, and each surface of the supporting members 6 comes in a contact with the other of the box frame 3 and the inner surface of the protection box 7. Thereby, when a force acts upon the support carrier members 5 and the box frame 3 from the supporting members 6, the supporting members 6 move and deform, and thereby the force is sufficiently buffered.

The protection box 7 is configured by polycarbonate containing glass fibers. For example, thickness of the protection box 7 is 2.5 mm, and an outer size of the protection box 7 is depth×width×height=160×95×38 mm. Further, the members 7a, 7b forming the protection box 7 are fixed to each other by fixing means such as a bolt. In this manner, since the protection box 7 is formed by two members 7a, 7b defined by dividing the protection box 7 into two at the center in the direction of the thickness of the protection box 7, the protection box 7 has an enhanced strength compared to that of the conventional protection box formed by the top plate, the bottom plate and the frame member described with reference to FIG. 9.

Furthermore, stiffness of the protection box 7 is improved based on a result of a drop test which was conducted by the inventors of the present invention. More precisely, the supporting members 6 and the protection box 7 are structured such that the value of an apparent spring constant k2 of the protection box 7 is double the value of an apparent spring constant k1 each of the supporting members 6 or larger.

The apparent spring constant k1 of the supporting members 6 is calculated from the below-mentioned equation (1), wherein "F" designates a value of the force including the impact force which acts upon the supporting members 6 from the protection box 7 when the protection box is dropped, and "xs" designates a maximum displacement of the supporting members 6 in the direction in which the force acts. The value of the apparent spring constant k1 is 130 kgf/cm, for example, and is adjustable by changing the material (hardness), the thickness and the area size of the surface to be contact with the inner surface of the protection box 7 in each the supporting members 6.

$$k1=F/xs \qquad (1)$$

The apparent spring constant k2 of the protection box 7 is calculated from the below-mentioned equation (2), wherein "F" designates the value of the force which acts upon the protection box 7 from the supporting members 6, and "xh" designates a maximum displacement of the protection box 7 in the direction in which the force acts. The value of the apparent spring constant k2 is 260 kgf/cm, for example, and is adjustable by changing material (hardness) and thickness of the protection box 7.

$$k2=F/xh \qquad (2)$$

The drop test conducted by the inventors of the present invention will be explained concretely.

During development of the storage apparatus 1, the inventors fabricated not only the only one type of the above-mentioned protection box 7 but also made a plurality of protection boxes which have various thicknesses and materials (hardnesses) as well, as comparison examples, and conducted the drop test in which each protection box 7 was dropped from the height of 80 cm as it contains the HDA 2, the box frame 3 and the supporting members 6. In the drop test, the inventors attached an acceleration pickup to the HDA 2 at the center of gravity thereof, and measured the impact force applied to the HDA 2 as the storage apparatus 1 was dropped.

As a result, in the case that the protection box 7 was formed thin (into a thickness of 1.5 mm, for instance) by a relatively soft material such as the ABS and POM (Polyacetal), the impact force (an impact acceleration) applied to the HDA 2 was large, in particular, when the storage apparatus 1 was dropped as the storage apparatus 1 was inclined at an angle. Consequently, the HDA 2 was permanently damaged.

These problems are considered to be attributed to the following causes (I) and (II):

(I) The protection box 7 deformed when acted upon by the impact force and obstructed a movement (displacement) of the supporting members 6, thereby the impact force acted upon the HDA 2 without mitigated by the supporting members 6.

(II) Due to a local deformation of the protection box 7, the elements inside the protection box 7 rotated, which in turn created an excessive roll acceleration.

In addition, there was a problem that as the drop test was conducted repeatedly, the protection box 7 deformed permanently and did not maintain the initial outer configuration any more, so that the internal elements became loose within the protection box 7.

Accordingly, it was found that it is necessary to enhance the stiffness of the protection box 7 itself in order to prevent an excessive impact caused by the deformation of the protection box 7 from acting upon the HDA 2. Further, through the drop test, it was confirmed that the above-mentioned problems can be prevented perfectly when the supporting members 6 and the protection box 7 are structured such that the value of the apparent spring constant k2 of the protection box 7 is double the value of the apparent spring constant k1 of the supporting members 6 or larger. That is, in the case that the supporting members 6 and the protection box 7 are structured such that the below-mentioned inequality (3) is satisfied, it is possible to prevent the excessive impact due to the deformation of the protection box 7 and upon the HDA 2.

$$2 \times (F/xs) \leq F/xh \tag{3}$$

A preliminary test was conducted with respect to the supporting members 6, and the supporting members 6 were optimized so that the shock resistance specification (300 G) of the HDA 2 in a non-operating state will not be superseded and the supporting members 6 will be deformed a small amount even when the supporting members 6 are dropped from a predetermined height (80 cm). After such optimization, the storage apparatus 1 was designed and dropped in the drop test. The result of the drop test is shown in Table 1.

TABLE 1

| | Material of the protection box 7 | Thickness of the protection box 7 | Test result | |
|---|---|---|---|---|
| | | | Maximum acceleration | Permanent deformation |
| Test example No. 1 | POM | 1.5 mm | 450 G | Deformed |
| Test example No. 2 | ABS | 1.5 mm | 450 G | Deformed |
| Test example No. 3 | ABS | 2.5 mm | 360 G | Deformed |
| Test example No. 4 | Polycarbonate containing glass fibers | 2.5 mm | 290 G | Not deformed |

As described above, the storage apparatus 1 of the first embodiment comprises the HDA 2 to serve as a storage portion, the box frame 3 for containing the HDA 2 and fixed to the HDA 2 by the bolts 8, and the protection box 7 for incorporating at least the HDA 2 and the box frame 3. Further, in the storage apparatus 1 of the first embodiment, the plurality of supporting members 6 are disposed between the box frame 3 and the inner surface of the protection box 7, and thereby, the supporting members 6 elastically support the HDA 2 and the box frame 3 in the protection box 7.

By the above-mentioned structure, it is possible to prevent the force including the impact force applied to the protection box 7 from outside from acting upon the HDA 2 directly, and hence, to mitigate the force from outside by the supporting members 6.

The shape of the box frame 3 is not limited to a box with the open top surface. Rather, the box frame 3 only needs to have a structure which allows the box frame 3 to be disposed around the HDA 2 in such a manner that the HDA 2 is fixed and held at a predetermined position in the protection box 7.

Second Embodiment

Figure 2:
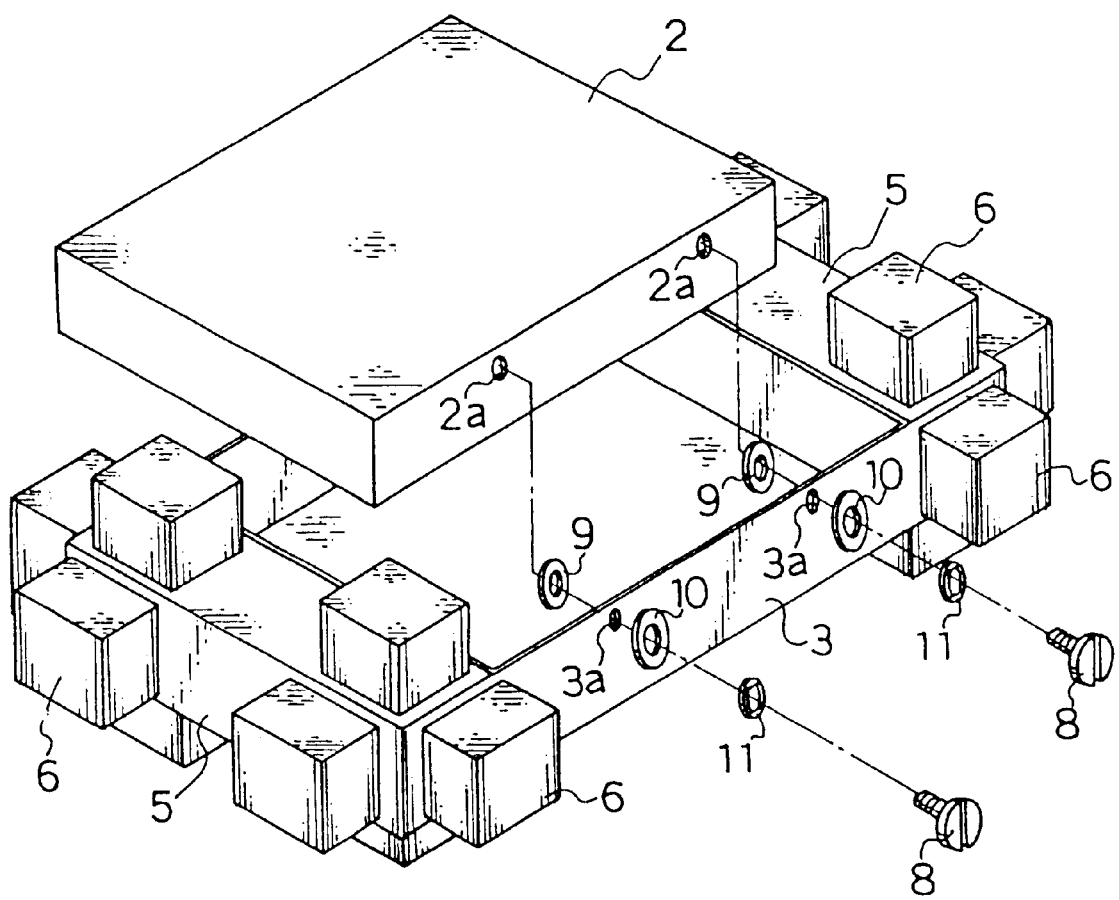
FIG. 2 is an exploded perspective view showing an internal structure of a storage apparatus in a second embodiment of the present invention.

FIG. 2 is an exploded perspective view showing an internal structure of a storage apparatus in a second embodiment of the present invention. In the structure of the storage apparatus of the present embodiment, the intermediate member is omitted and resin spacers having an elasticity are disposed between the HDA and the box frame. The other elements and portions are similar to those of the first embodiment, and therefore superposed description on the similar points are omitted.

As shown in FIG. 2, resin washers 9 of a resin which serve as resin spacers are disposed between the HDA 2 and the box frame 3. The bolts 8 are inserted into and fixed at the holes 2a of the HDA 2 through the holes 3a of the box frame 3 and the resin washers 9. Thereby, the HDA 2 and the resin washers 9 are fixed to each other. Further, in the storage apparatus 1 of this embodiment, in order to stabilize fitting seats for the bolts 8, flat washers 10 and spring washers 11 of metal are disposed outside the holes 3a of the box frame 3. The flat washers 10 and the spring washers 11 form fastening force maintaining parts for maintaining the fixed state (fastened state) of the HDA 2 and the box frame 3 by the bolts 8.

By using the resin washers 9, it is possible to create a predetermined gap between the HDA 2 and the box frame 3. Thereby, even when the surface of the box frame 3 on which the box frame 3 is fixed to the HDA 2 deforms due to the impact force acted as the storage apparatus 1 is dropped, the box frame 3 is prevented from directly hitting the HDA 2. Each thickness of the resin washers 9 is selected optimum based on the impact force acted as the storage apparatus 1 is dropped from the limit height to be guaranteed and the stiffness of the box frame 3.

In addition, since the resin washers 9, the flat washers 10 and the spring washers 11 are used, even when the storage apparatus 1 is dropped repeatedly, the HDA 2 and the box frame 3 can remain in the initial the fixed state (fastened state). Hence, it is possible to prevent a decrease in the fastening force of the bolts 8 due to repeated drops from creating the excessive impact force which acts upon the HDA 2.

Third Embodiment

Figure 3:
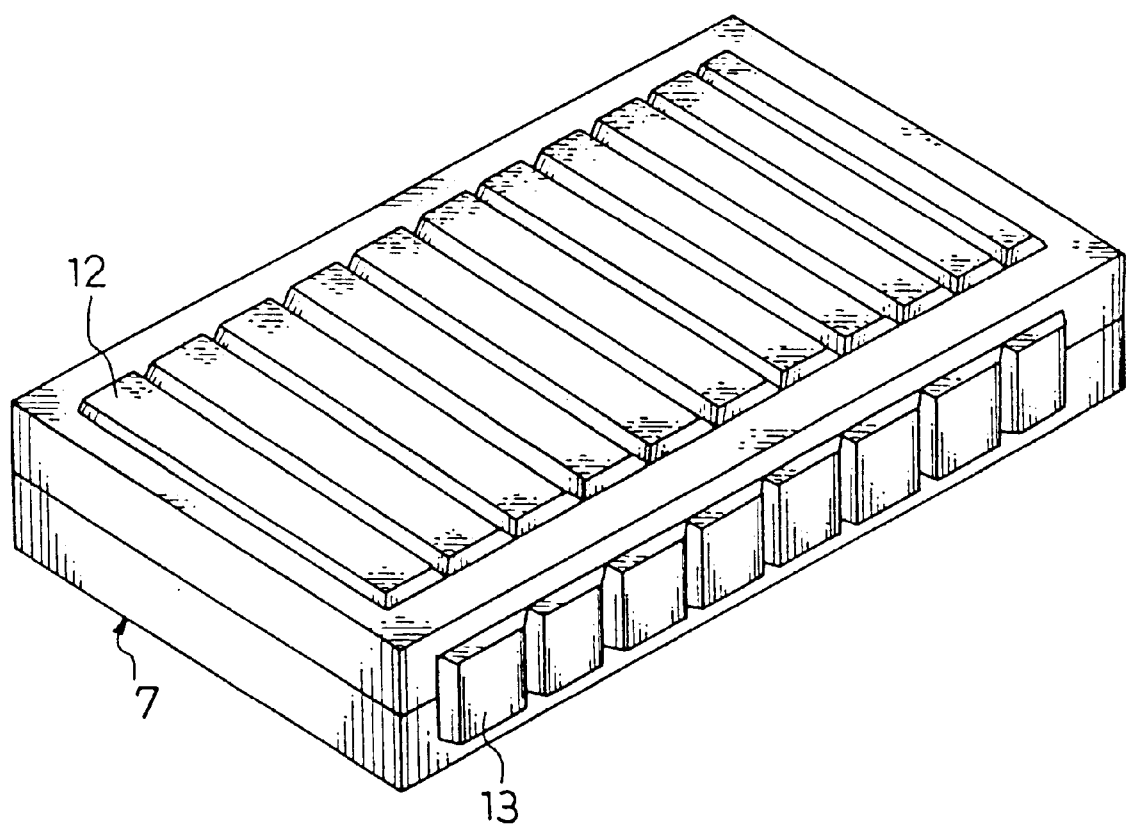
FIG. 3 is a perspective view showing a storage apparatus of a third embodiment of the present invention.

FIG. 3 is a perspective view showing a storage apparatus of a third embodiment of the present invention. In the structure of the storage apparatus of the present embodiment, slip-proof plates each having irregularities are disposed on the outer surface of the protection box. The other elements and portions are similar to those of the first embodiment, and therefore superposed description on the similar points are omitted.

As shown in FIG. 3, slip-proof plates 12 and 13 each having irregularities in each surface are fixed to the outer surface of the protection box 7. The slip-proof plates 12 and 13 are formed by a resin such as the ABS and fixed to the protection box 7 by an adhesive and the like. By this structure, it is possible to prevent for a user from dropping the storage apparatus 1 by mistake while the user carries the storage apparatus 1. Although this embodiment has been explained in relation to an example structure in which the slip-proof plates 12 and 13 are fixed to the protection box 7, a similar effect is obtained when the irregularities are formed directly in the surface of the protection box 7.

Fourth Embodiment

Figure 4:
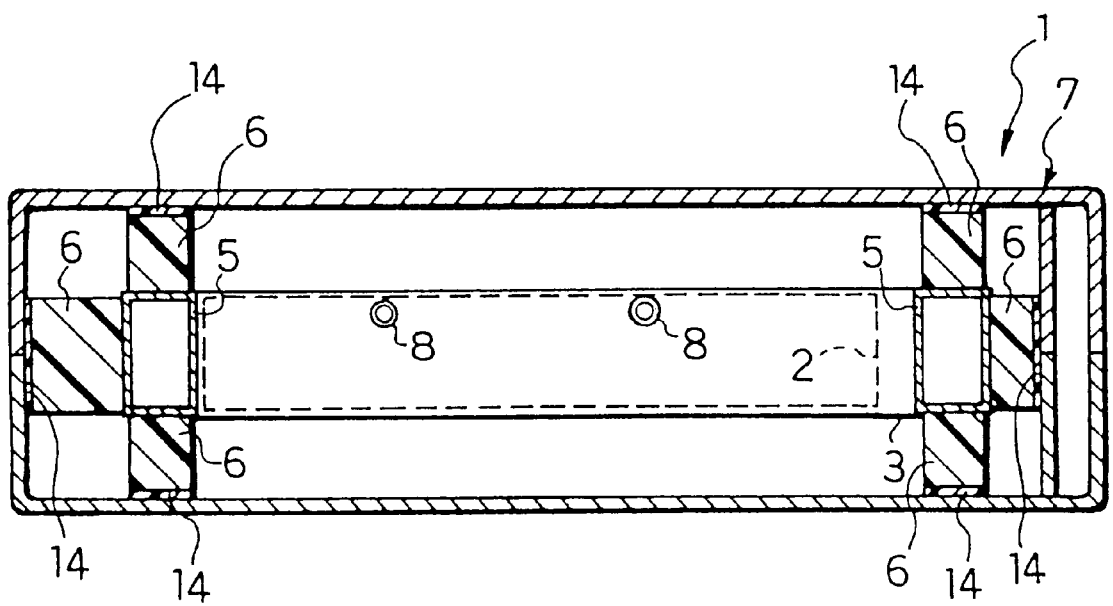
FIG. 4 is a cross sectional view showing an internal structure of a storage apparatus of a fourth embodiment of the present invention.

FIG. 4 is a cross sectional view showing an internal structure of a storage apparatus of a fourth embodiment of the present invention. In the structure of the storage apparatus of the present embodiment, plural resin members are disposed between the respective surfaces of the supporting members and the inner surface of the protection box, so that an initial displacement (compression in size) in the range of 5 to 15% of each free length of the supporting members is given to the respective supporting members disposed in the protection box. The other elements and portions are similar to those of the first embodiment, and therefore superposed description on the similar points are omitted.

In FIG. 4, plural resin members 14 are fixed on the respective surfaces of the supporting members 6 on the side of the protection box 7 by an adhesive double coated tape so that the respective resin members 14 are in a contact with the inner surface of the protection box 7. Each of the resin members 14 is formed by a material, which reduces a friction coefficient with the protection box 7, for example, the POM. Each of the supporting members 6 is compressed about 5 to 15% (e.g., 1 mm) of each free length of the supporting members 6 by the contacting resin members 14 in the protection box 7. Thereby, even when the thicknesses or the shapes of the box frame 3, the support carrier members 5 or the supporting members 6 are not made uniform, such differences are absorbed by the resin members 14. As a result, the surfaces of the supporting members 6 on the side of the protection box 7 remain in a stable contact with the inner surface of the protection box 7 through the resin members 14.

Further, when the storage apparatus 1 is dropped in the direction of the thickness of the storage apparatus 1, for example, the supporting members 6 arranged in the direction of the depth and the direction of the width of the storage apparatus 1 move, sliding on the inner surface of the protection box 7 in the direction of the thickness of the storage apparatus 1. The force of friction which acts upon the supporting members 6 in the opposite direction to the direction of the drop easily changes with time. Therefore, it is difficult to maintain the initial stable contact of the supporting members 6 and the protection box 7. In addition, in the worst case, the friction force acts upon the supporting members 6 only in some directions, and thereby the box frame 3 rotates about the supporting members 6. Further, there is a possibility that the impact force created by a rotation of the box frame 3 acts upon the HDA 2. Moreover, when the storage apparatus 1 is dropped in an oblique direction at an inclined state, the HDA 2 is subjected to the impact force created by the rotation. In this case, when the supporting members 6 and the protection box 7 are in an unstable contact with each other, the impact force created by the rotation may become excessively large. If the HDA 2 is subjected to the excessive impact force created by the rotation, the magnetic heads may move from a region without any data recorded to a region in which data are recorded on the recording medium, and thereby to destroy the data.

On the other hand, in this embodiment, the resin members 14 each having a relatively low friction coefficient are disposed on the surfaces of the supporting members 6 on the side of the protection box 7, so that it is possible to suppress the friction coefficient of the HDA 2 with the protection box 7 low. Further, since the resin members apply a pre-load to the supporting members 6, it is possible to prevent the rotation of the HDA 2 from creating the excessively large impact. Moreover, it is possible to prevent a deterioration in the function of the supporting members 6 due to the friction, and thereby, it is possible to maintain the buffering capability of the supporting members 6 over a long term.

In the case that the initial displacement given to the supporting members 6 is too large, the value of the apparent spring constant k1 of the supporting members 6 becomes too large, and thereby to allow a large impact force to act upon the HDA 2. On the other hand, in the case that the initial displacement is too small, the effect of suppressing the impact force created by the rotation is not obtained almost at all. Accordingly, in order to obtain the above-mentioned effect, it is desirable to dispose the supporting members 6 in the protection box 7, as the initial displacement is adjusted in the range of 5 to 15% of each free length of the supporting members 6.

Apart from the aforementioned explanation, wherein the resin members 14 are fixed on the respective surfaces of the supporting members 6 in a contact with the inner surface of the protection box 7, an alternative construction may be such that the resin members 14 are fixed to the inner surface of the protection box 7 in a contact with the respective surfaces of the supporting members 6.

Fifth Embodiment

Figure 5:
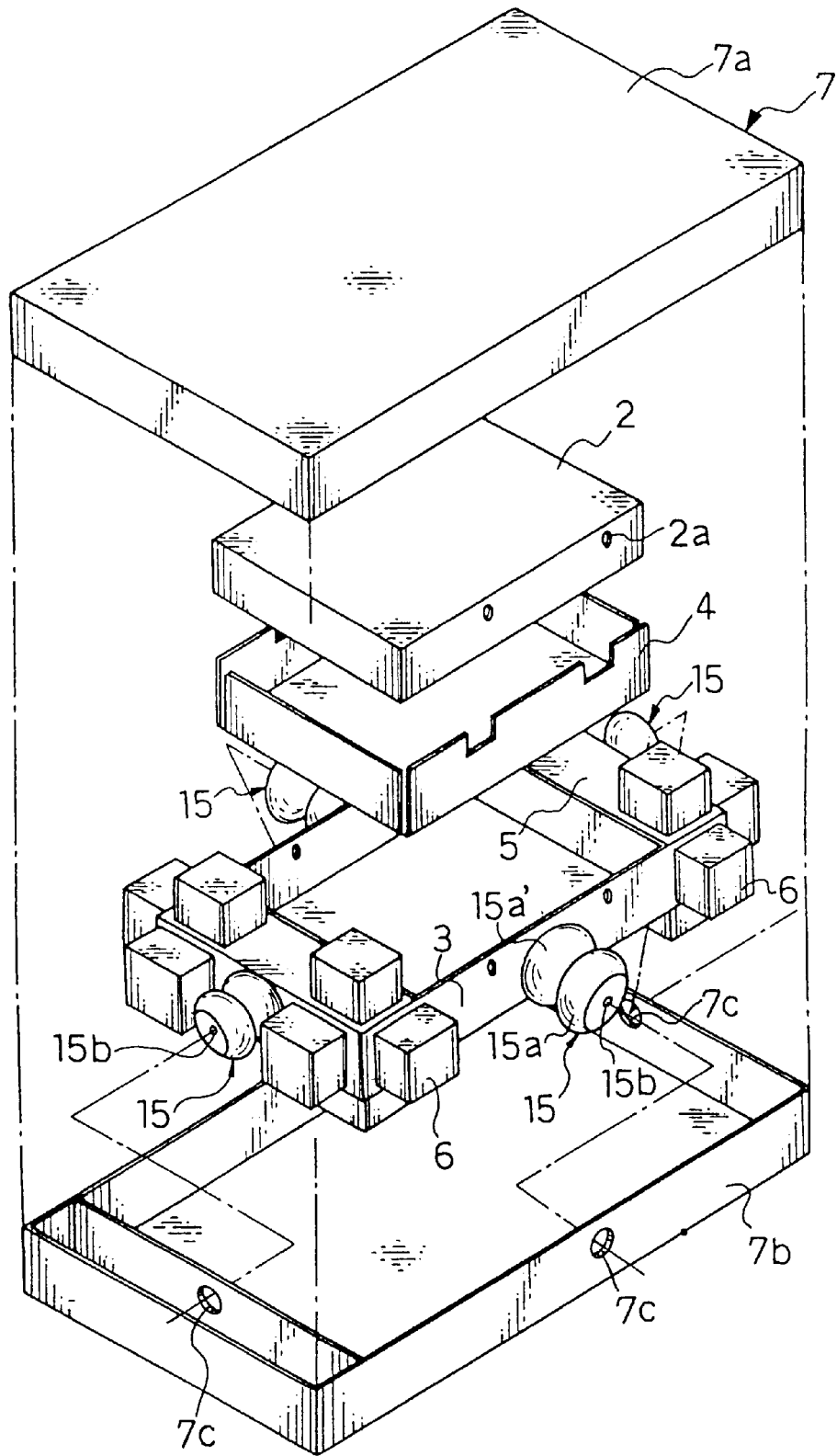
FIG. 5 is an exploded perspective view showing a storage apparatus of a fifth embodiment of the present invention.
Figure 6:
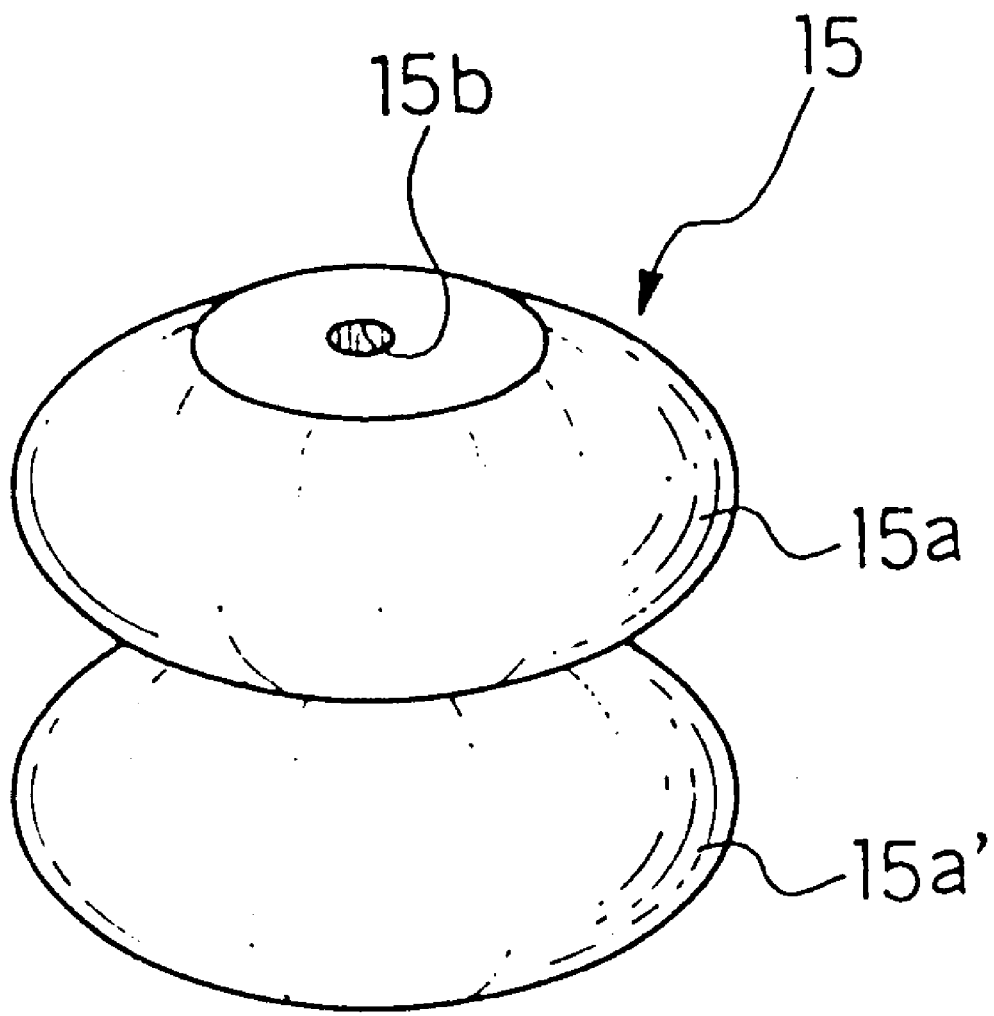
FIG. 6 is a perspective view showing an air damper shown in FIG. 5.

FIG. 5 is an exploded perspective view showing a storage apparatus of a fifth embodiment of the present invention, and FIG. 6 is a perspective view showing an air damper shown in FIG. 5. In the structure of the storage apparatus of the present embodiment, plural air dampers are disposed between the inner surface of the protection box and the box frame and between the inner surface of the protection box and the support carrier members. The other elements and portions are similar to those of the first embodiment, and therefore superposed description on the similar points are omitted.

As shown in FIGS. 5 and 6, each of plural air dampers 15 is formed by a plurality of, for example, two approximately cylindrical air chambers 15a and 15a' stacked one atop the other in such a manner that side surfaces of the air chambers are shaped as an accordion fold. Further, as shown in FIG. 6, an orifice 15b is formed in a surface of the air chamber 15a provided at one end thereof. The four air dampers 15 are provided between the inner surface of the protection box 7 and the box frame 3 and between the inner surface of the protection box 7 and the support carrier members 5, in such a manner that each of the orifices 15b is faced with air vent holes 7c formed in the member 7b of the protection box 7. An orifice which is a fine hole is not formed in a surface of the air chamber 15a' provided at the other end thereof, and this surface is in a contact with the outer surface of the box frame 3 or the respective outer surfaces of the support carrier members 5.

Figure 7:
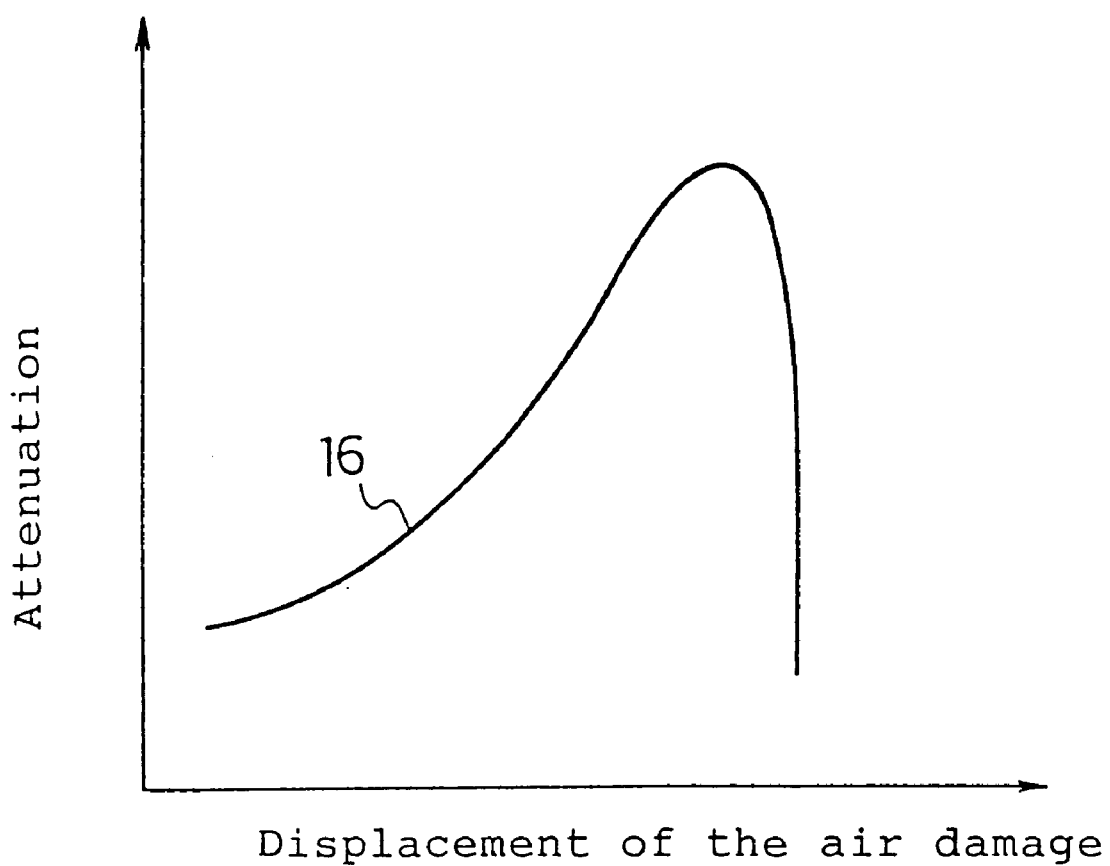
FIG. 7 is a graph showing an attenuation effect due to the air damper which is shown in FIG. 6.
Figure 8:
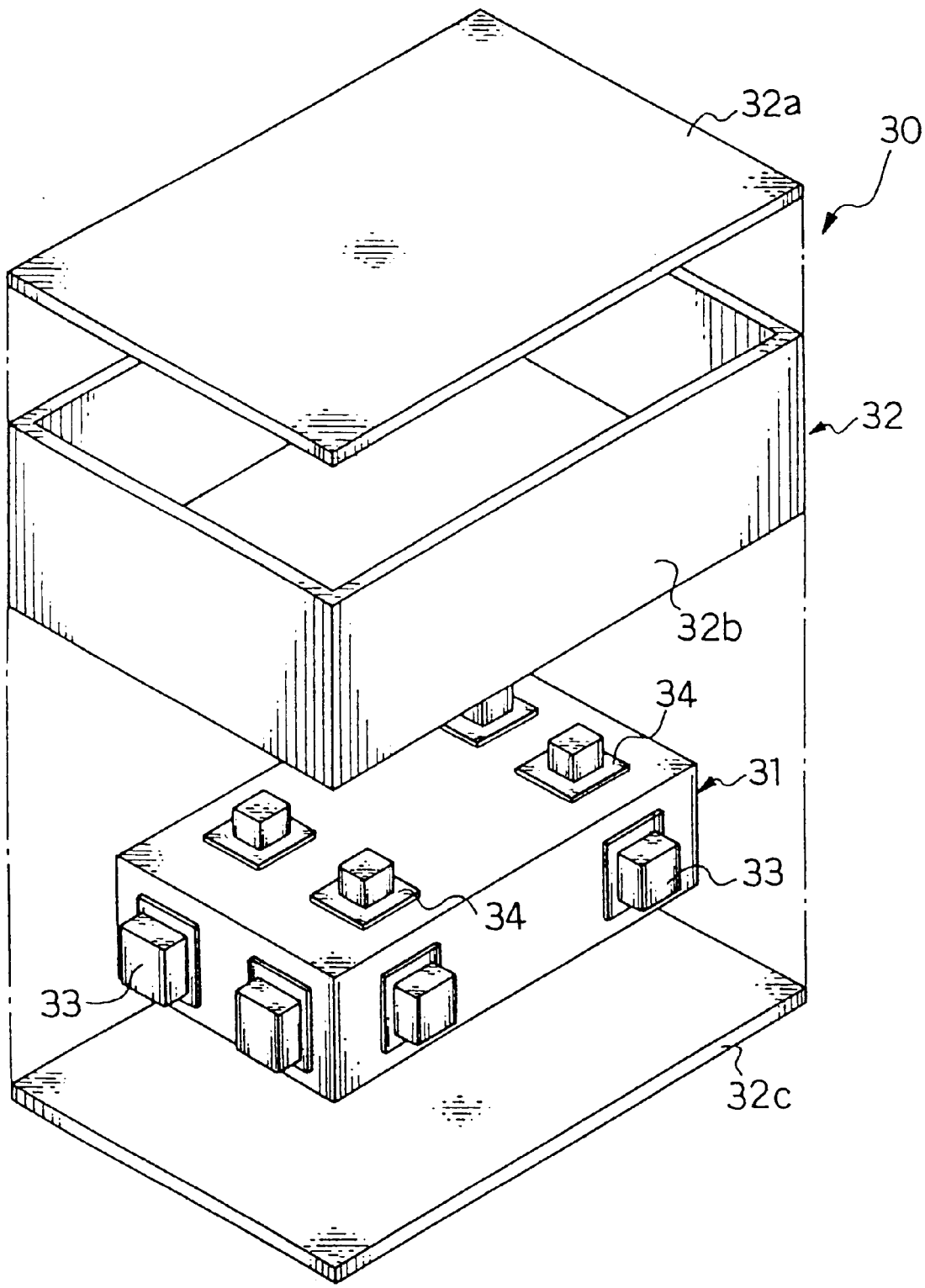
FIG. 8 is an exploded perspective view showing a conventional shockproof supporting apparatus for an HDD.

As the air dampers 15 are pressed by the box frame 3, the support carrier members 5 and the protection box 7, air blows out through the orifices 15b and an attenuation effect is obtained by a loss due to a difference between the pressures of the blow outs. The attenuation effect due to the air dampers 15 exhibits non-linear attenuation with respect to a damper displacement (deformation), as indicated by the curve 16 in FIG. 7.

In the storage apparatus 1 of this embodiment, by using the air dampers 15, it is possible to improve the ability of absorbing the impact force upon the storage apparatus 1 and to form the storage apparatus 1 in a small size. Further, in the case that the air dampers 15 are formed by a resin, it is possible to attenuate the impact force having a high frequency which propagates the surfaces of the air dampers 15, unlike in the case that the air dampers 15 are formed by metal, for example.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

We claim:

1. A storage apparatus comprising:

storage means, holding means disposed around said storage means and for holding said storage means, a protection box for containing said storage means and said holding means, and a supporting member disposed between said holding means and said protection box, and said supporting member for supporting said holding means to said protection box elastically.

2. The storage apparatus in accordance with claim 1, wherein said holding means includes a box frame for containing said storage means, fixing means for fixing said storage means and said box frame, and an intermediate member disposed between said storage means and said box frame, and said supporting member is disposed between said box frame and said protection box, said supporting member is fixed to one of said box frame and said protection box, and said supporting member elastically supporting said box frame in said protection box.

3. The storage apparatus in accordance with claim 2, wherein said intermediate member is formed by a resin sheet.

4. The storage apparatus in accordance with claim 1, wherein said holding means includes a box frame for containing said storage means, fixing means for fixing said storage means and said box frame, and a resin spacer disposed between said fixing means and said box frame, and said supporting member is disposed between said box frame and said protection box, said supporting member is fixed to one of said box frame and said protection box, and said supporting member elastically supporting said box frame in said protection box.

5. The storage apparatus in accordance with claim 4, wherein said fixing means fixes said storage means and said box frame to each other through fastening force maintaining means disposed outside said box frame.

6. The storage apparatus in accordance with claim 1, wherein irregularities are formed in an outer surface of said protection box.

7. The storage apparatus in accordance with claim 1, wherein a slip-proof plate having irregularities is disposed on an outer surface of said protection box.

8. The storage apparatus in accordance with claim 1, wherein said supporting member and said protection box are structured so as to satisfy the following relationship:

$$2\times(F/xs) \leq F/xh$$

wherein xs is a maximum displacement of said supporting member in a direction in which force F acts when said force F acts upon said supporting member from said protection box, and xh is a maximum displacement of said protection box in the direction in which said force F acts when said force F acts upon said protection box from said supporting member.

9. The storage apparatus in accordance with claim 1, wherein said protection box is formed by a material which is divided into two portions of an upper portion and a lower portion at the center of said protection box in the direction of the thickness of said protection box.

10. The storage apparatus in accordance with claim 1, wherein said supporting member is disposed in said protection box in such a condition that said supporting member has an initial displacement of 5 to 15% of a free length of said supporting member.

11. The storage apparatus in accordance with claim 10, wherein as means for applying said initial displacement to said supporting member disposed in said protection box, a resin member is disposed on a surface of said supporting member on the side of said protection box.

12. The storage apparatus in accordance with claim 1, wherein an air damper is disposed between an inner surface of said protection box and said box frame, and an air vent hole for exhausting air from said air damper is formed in said protection box.

13. The storage apparatus in accordance with claim 12, wherein said air damper includes approximately cylindrical air chambers stacked into a stack of at least two portions of an upper portion and a lower portion in such a manner that side surfaces of said air chambers are shaped as an accordion fold, and an orifice is formed in a surface of one of said air chamber disposed at one end in such a manner that said orifice is directed toward said air vent hole.

14. The storage apparatus in accordance with claim 12, wherein said air damper is formed by a resin.

15. A shockproof case for a storage apparatus which comprising:

holding means disposed around storage means to be held, said holding means fixed to said storage means, a protection box for containing said storage means and said holding means, and a supporting member disposed between said holding means and said protection box, and said supporting member elastically supporting said holding means to said protection box.

* * * * *